Oct. 25, 1932.  M. P. HOLMES  1,884,693
MINING APPARATUS
Filed Dec. 18, 1929    9 Sheets-Sheet 3

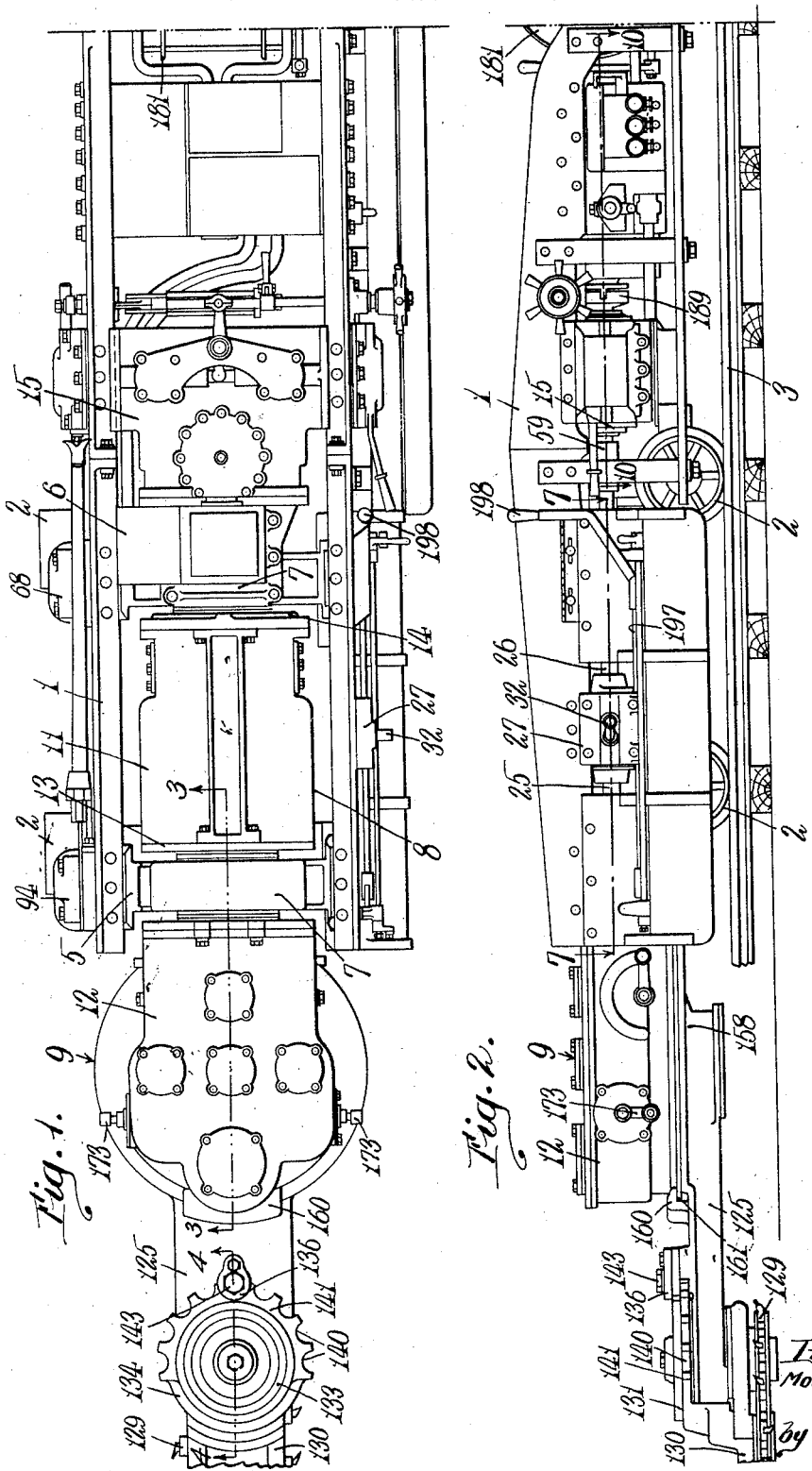

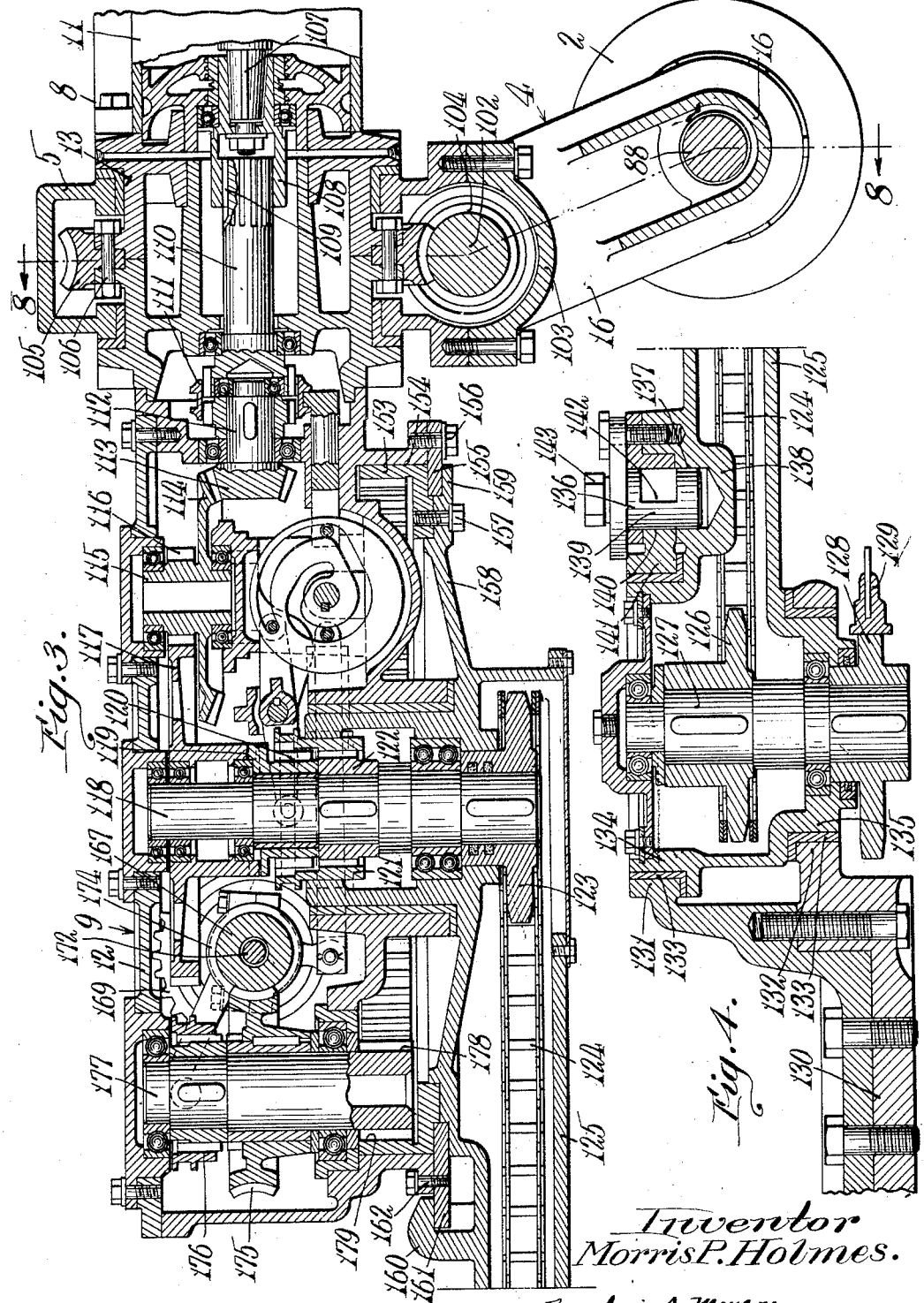

Inventor:
Morris P. Holmes
by Louis A. Maxson
Atty.

Oct. 25, 1932.  M. P. HOLMES  1,884,693
MINING APPARATUS
Filed Dec. 18, 1929   9 Sheets-Sheet 4

Oct. 25, 1932.     M. P. HOLMES     1,884,693
MINING APPARATUS
Filed Dec. 18, 1929     9 Sheets-Sheet 5

Inventor.
Morris P. Holmes
by [signature]
Atty.

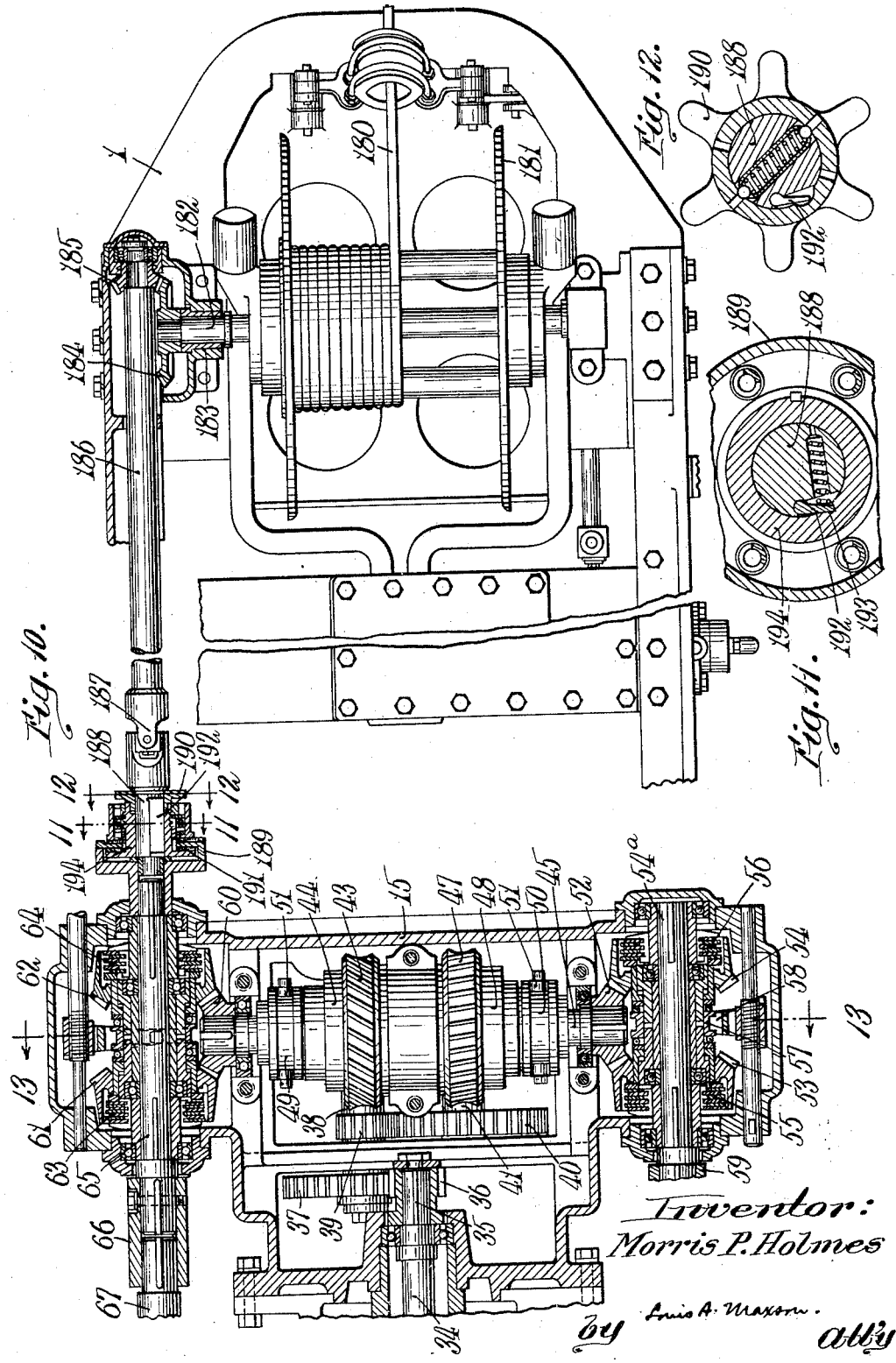

Oct. 25, 1932.  M. P. HOLMES  1,884,693
MINING APPARATUS
Filed Dec. 18, 1929   9 Sheets-Sheet 7

Inventor:
Morris P. Holmes
By Luis A. Maxon.
Atty.

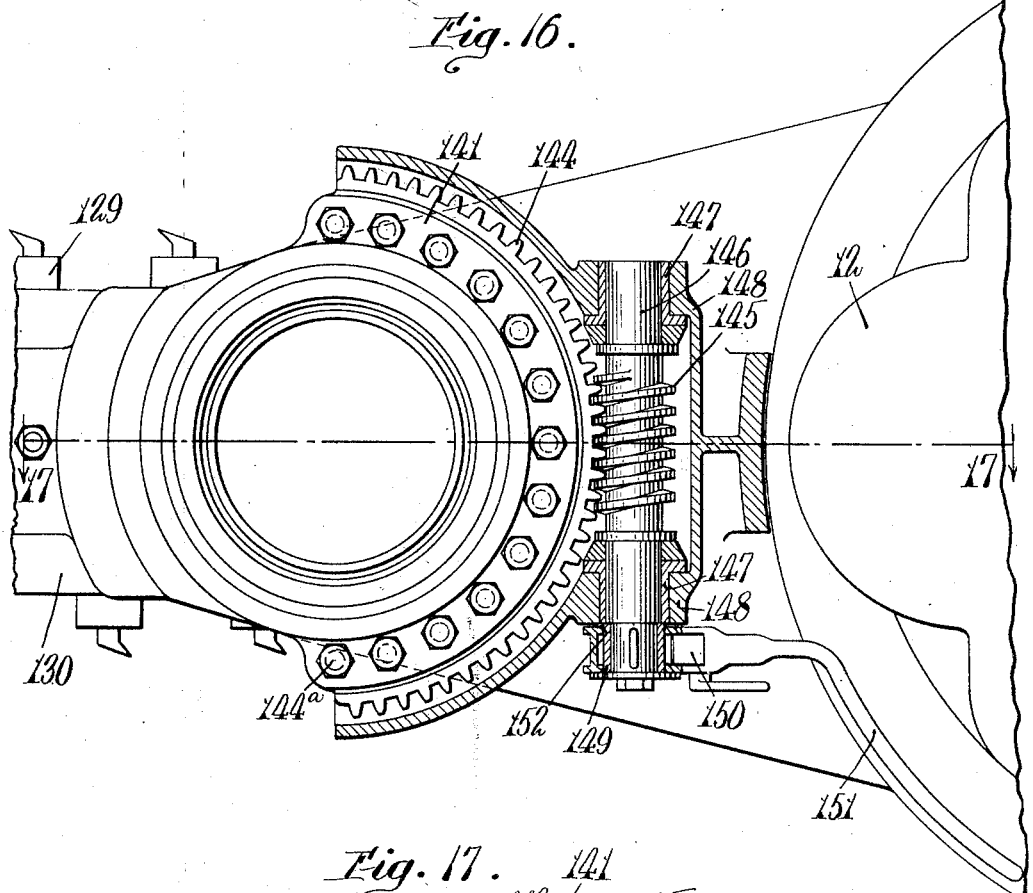
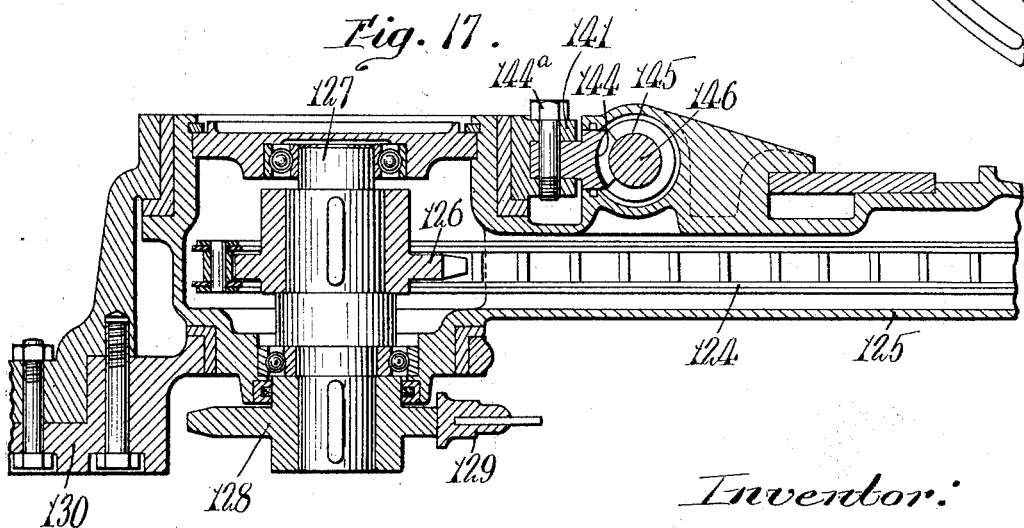

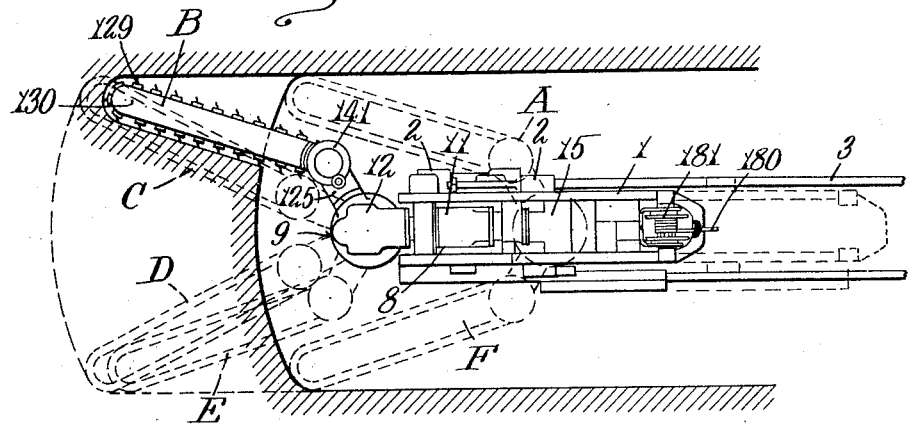
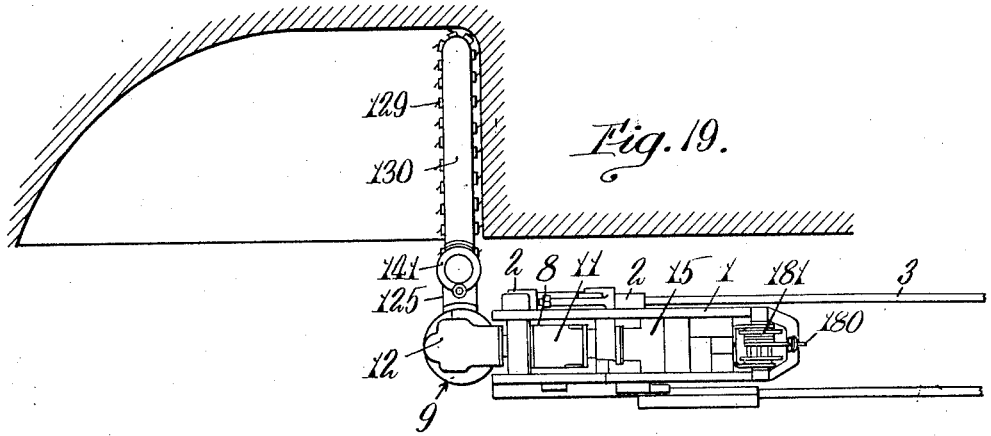
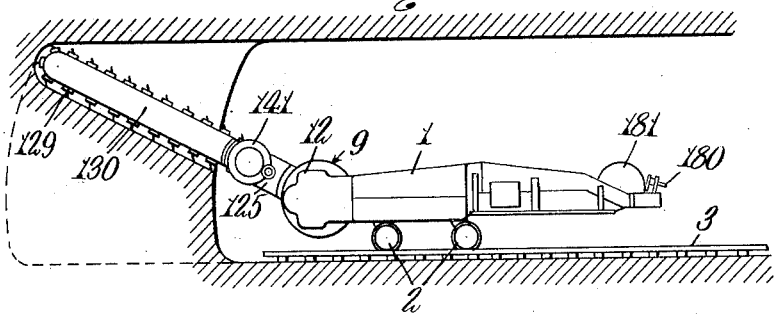

Patented Oct. 25, 1932

1,884,693

UNITED STATES PATENT OFFICE

MORRIS P. HOLMES, OF CLAREMONT, NEW HAMPSHIRE, ASSIGNOR TO SULLIVAN MACHINERY COMPANY, A CORPORATION OF MASSACHUSETTS

MINING APPARATUS

Application filed December 18, 1929. Serial No. 415,051.

This invention relates to mining apparatus and more particularly to coal mining apparatus of the wheel mounted type adapted to operate from the mine trackway and having adjustable kerf cutting mechanism.

An object of this invention is to provide an improved coal mining apparatus. Another object is to provide an improved coal mining apparatus of the wheel mounted type adapted to operate from the mine trackway and having improved adjustable kerf cutting mechanism. A further object is to provide a coal mining apparatus of the so-called combined type having improved adjustable kerf cutting mechanism adapted both for horizontal cutting and shearing. Still another object is to provide an improved mining apparatus of the wheel mounted bottom cutting type having an improved adjustable kerf cutting mechanism and improved means for adjusting the same whereby a kerf may be cut at or near the level of the mine bottom. A further object is to provide an improved coal mining apparatus of the wheel mounted bottom cutting type adapted to operate from the mine trackway and having improved adjustable kerf cutting mechanism whereby the kerf cutter may be positioned in an improved manner to cut a horizontal kerf at or near the level of the mine bottom. A further object is to provide an improved coal mining apparatus of the wheel mounted bottom cutting type adapted to operate from the mine trackway and having improved adjustable kerf cutting mechanism whereby the kerf cutter may be positioned in an improved manner to cut a horizontal kerf at or near the level of the mine bottom outside of and below the level of the mine trackway. Yet another object is to provide in a mining apparatus of the aforesaid character an improved offset pivotal mounting for the kerf cutter whereby the latter may be quickly and with facility positioned with its pivot outside the mine trackway and improved mechanism for thereafter adjusting the kerf cutter to a position below the level of the track rails at or near the level of the mine bottom. Still another object is to provide an improved adjustable kerf cutter capable of performing the aforesaid bottom cutting functions and including mechanism for positioning the kerf cutter to enable the latter to make vertical or shear cuts. These and other objects and advantages of this invention will, however, hereinafter more fully appear in the course of the following description and as more particularly pointed out in the appended claims.

In the accompanying drawings there is shown for purposes of illustration one form and a detail modification thereof which the invention may assume in practice.

In these drawings,—

Fig. 1 is a top plan view of the illustrative embodiment of the improved mining apparatus, parts being broken away to facilitate illustration.

Fig. 2 is a side elevational view of the apparatus shown in Fig. 1.

Fig. 3 is an enlarged central longitudinally extending vertical sectional view taken substantially on line 3—3 of Fig. 1.

Fig. 4 is a detail sectional view illustrating the improved pivotal mounting for the cutter bar, the view being taken substantially on line 4—4 of Fig. 1.

Fig. 10 is a horizontal longitudinally extending sectional view taken substantially on line 10—10 of Fig. 2, the view being partially shown in plan.

Figs. 11 and 12 are detail sectional views taken substantially on lines 11—11 and 12—12 respectively of Fig. 10.

Figure 13:
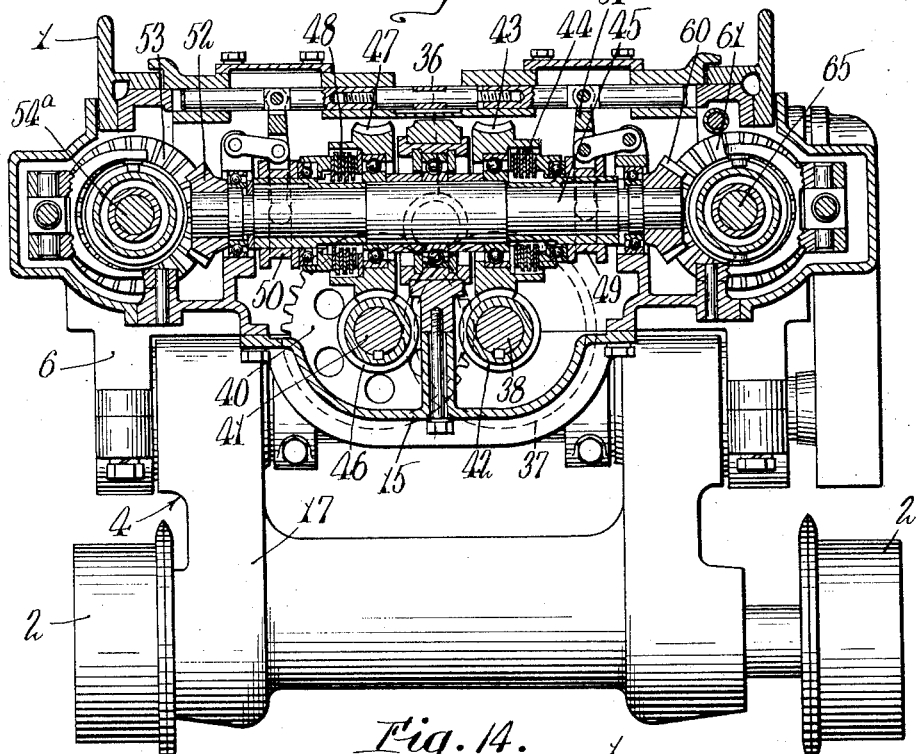

Fig. 13 is a transverse vertical sectional view taken substantially on line 13—13 of Fig. 10.

Figure 14:
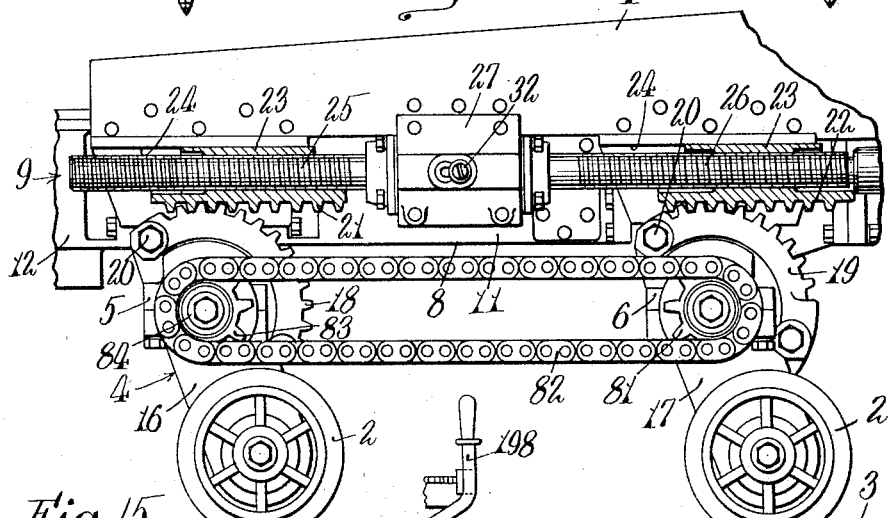

Fig. 14 is a fragmentary side elevational view, partially shown in section, illustrating the elevating and tilting means.

Figure 15:
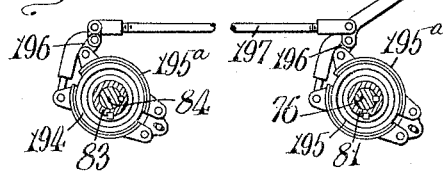

Fig. 15 is a detail view illustrating truck wheel braking means.

Fig. 16 is a fragmentary plan view partially shown in section and illustrating a modified form of bar adjusting and locking means.

Fig. 17 is a detail sectional view taken on line 17—17 of Fig. 16.

Fig. 18 is a diagrammatic plan view illustrating the apparatus making a horizontal arcwall cut at or near the level of the mine bottom outside the mine trackway.

Fig. 19 is a diagrammatic plan view showing the machine making a horizontal longwall cut on the mine bottom at one side of the mine trackway.

Fig. 20 is a diagrammatic elevational view illustrating the apparatus making a vertical or shear cut.

In this illustrative embodiment of the invention there is shown a coal mining apparatus of the wheel mounted universal or so-called combined type adapted to operate from the mine trackway and which may be of the same general type as that disclosed in my copending applications Ser. No. 137,600, filed Sept. 24, 1926 and Ser. No. 230,034, filed Oct. 31, 1927, now matured into Patent No. 1,785,961, patented Dec. 23, 1930, and Patent No. 1,849,297, patented Mar. 15, 1932, respectively; the apparatus shown herein having improved adjustable kerf cutting mechanism whereby the kerf cutter may be positioned outside of and below the level of the mine trackway whereby a horizontal kerf may be cut at or near the level of the mine bottom. The mining apparatus, in the illustrative form disclosed, generally comprises a supporting frame 1 mounted on and supported by truck wheels 2 adapted to run along a mine trackway 3 and having adjustable elevating and tilting mechanism generally designated 4 between the truck wheels and supporting frame for elevating the frame relative to the truck wheels and for tilting the frame about a transverse axis to change its angle relative to the horizontal. The supporting frame 1 is suitably secured to transverse frame members 5 and 6 spaced apart longitudinally of the frame and having bearing means 7 in which a body 8 is mounted for rotation about a longitudinally extending axis. This body carries at its forward end improved adjustable kerf cutting mechanism generally designated 9. As described in the above mentioned copending applications, the body 8 houses a motor 10 herein preferably of the reversible electric type having its armature shaft longitudinally disposed and which drives, as hereinafter described, the kerf cutting mechanism 9, the truck wheel driving mechanism, the mechanism for rotating the body about its axis, the elevating and tilting mechanism 4 and the various other elements of the apparatus. More specifically, the rotatable body 8 comprises a motor section 11 housing the motor 10, a cutter carrying section 12 and bearing sections 13 and 14, the section 13 being rigidly secured to and connecting the sections 11 and 12, while the section 14 is rigidly secured to the rear end of the motor section 11 and these bearing sections have bearing means mounted within the bearing means 7 on the frame members 5 and 6. Suitably secured to the rear transverse frame member 6 and the supporting frame 1 is a frame or housing 15 containing transmission mechanism through which certain devices of the apparatus are driven as is also later described.

The adjustable supporting means for the cutter supporting frame 1 for elevating and tilting the latter includes pivoted supporting arms or legs 16 and 17, connected as will later be described, to the transverse frame members 5 and 6 and the truck wheel axles, the supporting arms and truck wheels constituting the support for the apparatus. The mechanism for simultaneously swinging the arms or legs about their respective pivots comprises gear segments 18 and 19 (see Figs. 8, 9 and 14) secured as by screws 20 to projecting lugs integral with the supporting arms respectively. Meshing with the teeth of these gear segments are sliding racks 21 and 22 respectively herein formed integral with internally threaded members or nuts 23 slidable within longitudinal guideways 24 preferably formed integral with the transverse frame members 5 and 6 at one side thereof. Threadedly engaging these nut members 23 are alined screw threaded shafts 25 and 26 respectively. As clearly shown in Fig. 7 the adjacent ends of these screw shafts are journaled within a clutch housing 27 suitably secured to one side of the supporting frame 1, and respectively secured to the adjacent ends of these shafts and contained in the housing are clutch members 28 and 29. These clutch members are connectible together by means of a sliding clutch member 30 having a suitable slidable operating member 31 guided in the housing and carrying an operating handle 32. It will thus be seen that the screw shafts 25 and 26 may be connected together for simultaneous rotation and the shaft 25 may be disconnected from the shaft 26 at will. Now referring to the mechanism driven by the motor 10 for rotating the screw shafts 25, 26 by power, it will be noted that connected by a suitable coupling 33 to the rear end of the armature shaft of the motor (see Fig. 7) and arranged with its axis coincident with the axis of rotation of the body 8 supporting the cutting mechanism is a shaft 34.

This shaft is journaled at its rear end within the transmission housing 15 and as shown in Figs. 10 and 13 has secured thereto as by a key 35 a spur pinion 36. This spur pinion meshes with a spur gear 37 fixed to a longitudinally extending horizontal shaft 38 suitably journaled within the transmission housing. Also fixed to the shaft 38 is a spur pinion 39 meshing with a spur gear 40 fixed to a shaft 41 arranged parallel with the shaft 38 and likewise journaled within the transmission housing. Secured as by a key to the shaft 38 is a worm 42 meshing with a fast speed worm wheel 43. This worm wheel is connectible by a friction disc clutch 44 to a horizontal shaft 45 journaled within the transmission housing and extending transversely of the apparatus. Fixed as by a key to the shaft 41 is a worm 46 meshing with a slow speed worm wheel 47 also connectible by a friction disc clutch 48 to the shaft 45. It will thus be seen that when the friction clutch 44 is applied and the clutch 48 released, the shaft 45 may be driven at a relatively fast speed, and that when the clutch 48 is applied and the clutch 44 released, the shaft 45 may be driven in the same direction at a relatively slow speed. The friction clutches 44 and 48 are respectively provided with clutch applying members 49 and 50 having suitable actuating means including pivoted shipper yokes 51. Suitable operating means for these yokes similar to those described in the above mentioned application Ser. No. 230,034 may be provided for swinging the shipper yokes to effect alternative application of the friction clutches. Referring more particularly to Fig. 10, it will be noted that secured as by a key to one end of the shaft 45 is a bevel pinion 52 meshing with reverse bevels 53 and 54. These reverse bevels are alternatively connectible to a longitudinally extending shaft 54a by means of friction disc clutches 55 and 56 respectively, to effect rotation of this shaft in either of opposite directions. These friction clutches 55, 56 are provided with suitable operating means including a slidable clutch applying member 57 mounted on the adjacent hubs of the reverse bevels for movement in opposite directions by means of a pivoted shipper yoke 58. The means for swinging the shipper yokes to effect alternative application of the friction clutches may be generally the same as that described in the above mentioned copending applications. As illustrated, the shaft 54a extends longitudinally along one side of the supporting frame 1 and is alined with and connected, as by a suitable coupling 59, to the screw shaft 26. From the foregoing description it is evident that when one or the other of each of the sets of clutches 44, 48 and 55, 56 are applied, the screw shafts 25 and 26 may be rotated in either of opposite directions at a relatively high speed or a relatively low speed, thereby effecting sliding movement of the racks 21 and 22 within their guides, swinging the arcuate racks 18, 19 together with their respective supporting arms about their pivots to either raise or lower the supporting frame 1 together with the cutting mechanism carried thereby. If it is desired to adjust the rear supporting arm 17 relative to the front supporting arm 16 to tilt the frame either upwardly or downwardly about a transverse axis, this may be accomplished simply by sliding the clutch member 30 in a direction to disconnect the clutch element 28 secured to the screw shaft 25 from the clutch element 29 secured to the screw shaft 26, thereby releasing the shaft 25 from the shaft 26. In view of the fact that this elevating and tilting mechanism is described in my copending applications mentioned above, further description of the same herein is considered unnecessary.

Figure 7:
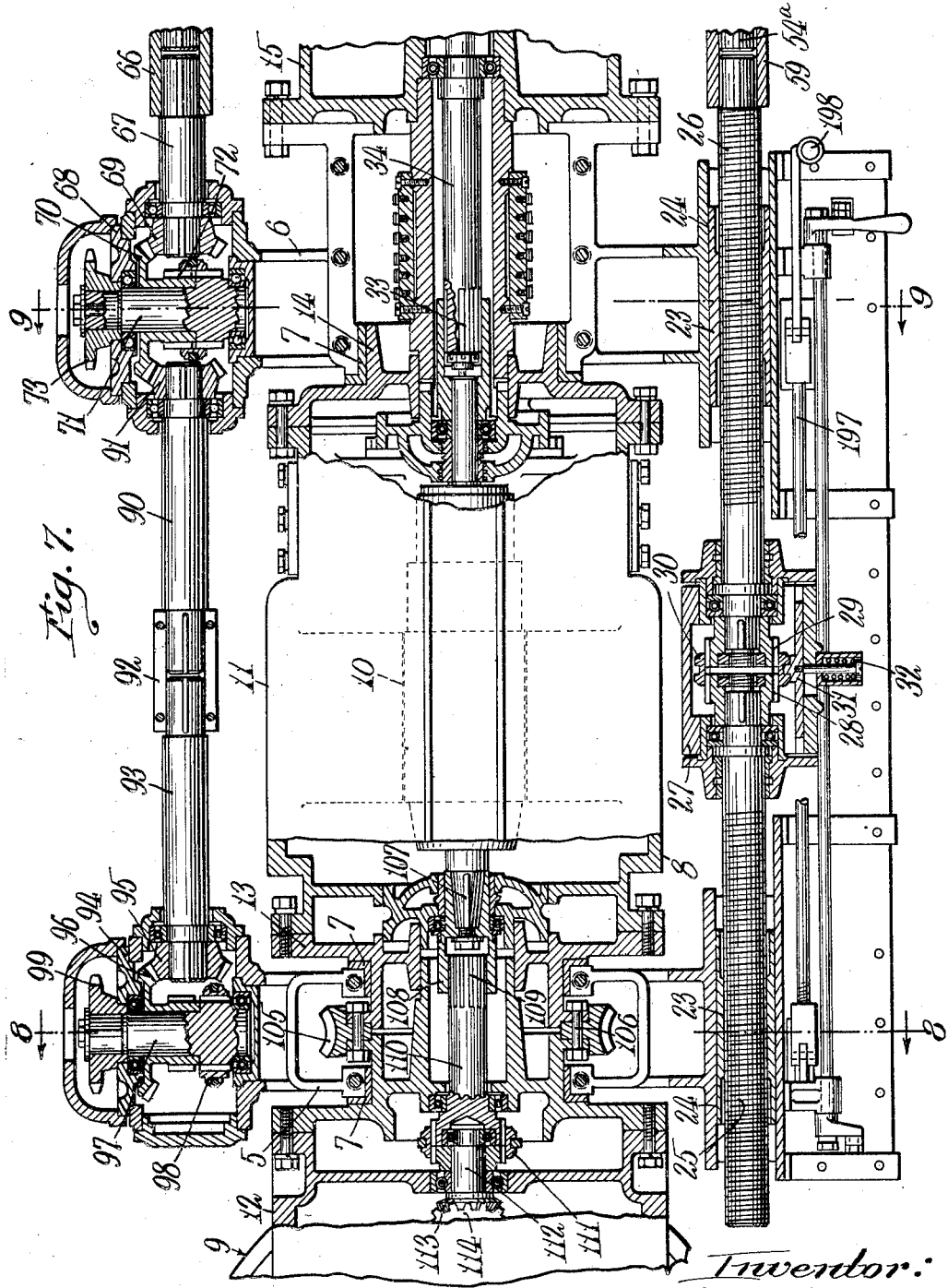
Fig. 7 is a horizontal longitudinally extending sectional view taken substantially on line 7—7 of Fig. 2, parts being shown in plan.
Figure 8:
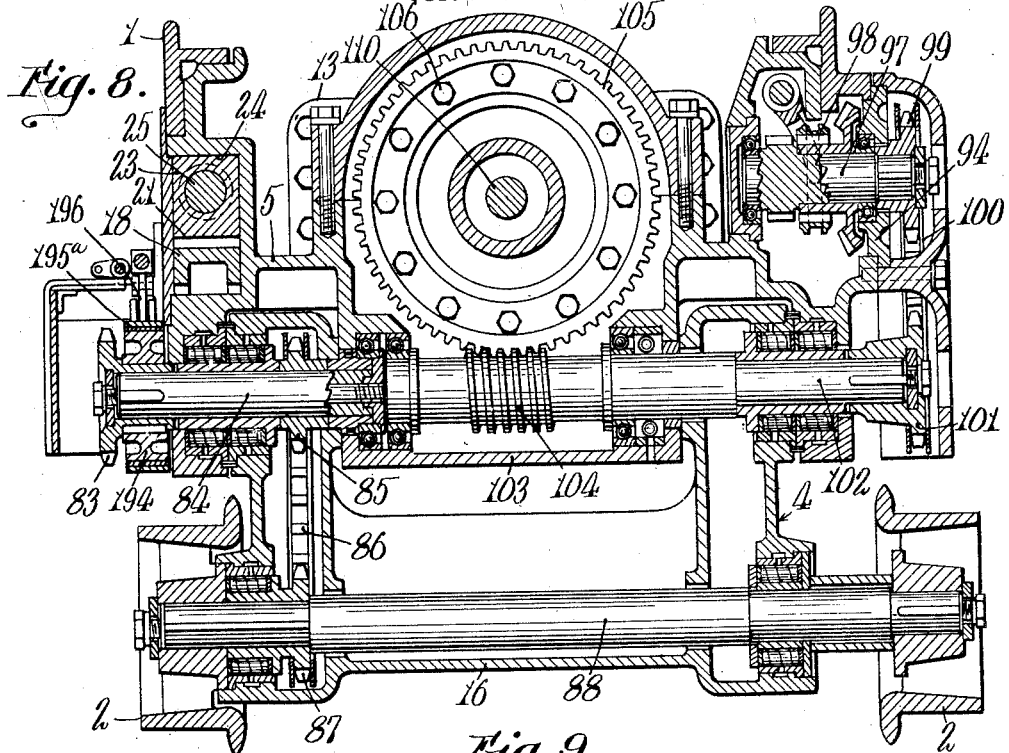
Fig. 8 is a transverse vertical sectional view taken substantially on line 8—8 of Figs. 3 and 7.
Figure 9:
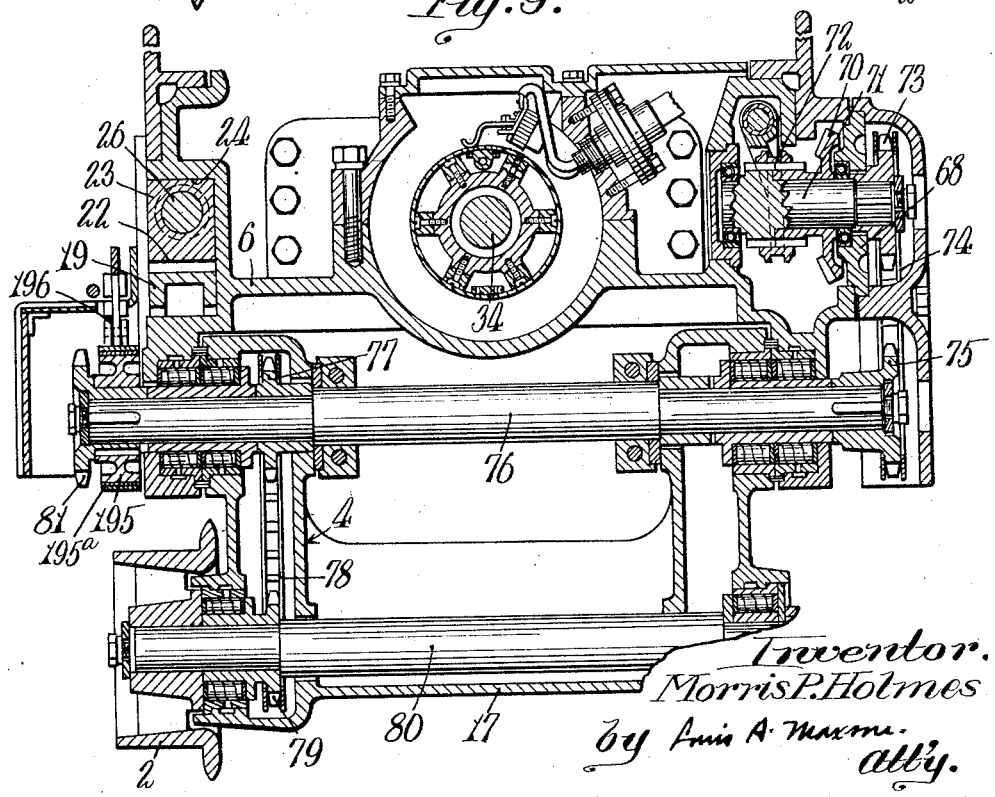
Fig. 9 is a transverse vertical sectional view taken substantially on line 9—9 of Fig. 7.

Now referring to the mechanism for driving the truck wheels to propel the apparatus along the mine trackway, it will be noted that secured to the shaft 45 as by a key (see Fig. 10) is a bevel pinion 60 meshing with reverse bevels 61 and 62 selectively connectible by friction disc clutches 63 and 64 respectively, to a longitudinally extending shaft 65 arranged parallel with and at the opposite side of the supporting frame from the shaft 54a above referred to. Connected as by a suitable coupling 66 to and alined with the shaft 65 is a shaft 67 which, as shown in Fig. 7, is journaled at its forward end within a gear and clutch housing 68 herein formed integral with the rear transverse frame member 6. Keyed to the shaft 67 is a bevel gear 69 meshing with a bevel gear 70 journaled on a transverse shaft 71. This transverse shaft is suitably journaled within the housing 68 and is connectible to the bevel gear 70 by a jaw clutch 72 of a usual design. Fixed to the outer end of the shaft 71 is a chain sprocket 73 connected by an endless chain 74 to a chain sprocket 75 keyed to one end of a horizontal transversely extending shaft 76. As shown in Fig. 9 the shaft 76 is arranged with its axis coincident with the pivotal axis of the rear supporting arm or leg 17. Also fixed to the shaft 76 is a chain sprocket 77 connected by an endless chain 78, housed within the supporting arm 17, to a chain sprocket 79 fixed to a rear truck wheel axle 80 suitably journaled within the arm 17. Secured as by a key to one end of the shaft 76 is a chain sprocket 81 connected by an endless chain 82 (see Fig. 14) to a chain sprocket 83 keyed, as shown in Fig. 8, to a horizontal shaft 84. The shaft 84 extends transversely of the apparatus and is arranged with its axis coincident with the pivotal axis of the front supporting arm 16. As illustrated, also fixed to the shaft 84 is a chain sprocket 85 connected by an endless chain 86 housed in the arm 16, to a chain sprocket 87 fixed to a front truck wheel axle 88 suitably journaled within the supporting arm 16. As shown in Figs. 8 and 9 the shaft 76 carries sleeves engaging antifriction bearings supported by the transverse frame member 6 and the supporting arm 17 respectively, while the shaft 84 forms a similar pivotal mounting for one side of the front supporting arm 16, the parts being so arranged that irrespective of the angular position of the supporting arms about their respective pivots the truck wheels may be driven through the connections above referred to. It is therefore evident that the truck wheels may be driven at either a relatively high transport speed or a relatively slow speed appropriate for cutting under the control of the friction clutches 44 and 48 and at either speed selectively in opposite directions under the control of the reverse frictions 63 and 64.

The mechanism for effecting rotation of the cutter supporting body 8 about its pivotal axis herein comprises a shaft 90 (see Fig. 7) alined with the shaft 67 and journaled at its rear end within the housing 68. The shaft 90 has secured thereto as by a key at its rear end a bevel gear 91 meshing with the bevel gear 70. Connected to, as by a suitable coupling 92, and alined with the shaft 90 is a shaft 93 journaled at its forward end within a gear and clutch housing 94 herein formed integral with the front transverse frame member 5. Secured as by a key to the forward end of the shaft 93 is a bevel gear 95 meshing with a bevel gear 96. This bevel gear is journaled on a transverse shaft 97 and is connectible to the shaft by a jaw clutch 98 of a usual design. The shaft 97 is suitably journaled within the housing 94 and has fixed thereto as by a key at its outer end a chain sprocket 99 connected as shown in Fig. 8 by an endless chain 100 to a chain sprocket 101 keyed to one end of a horizontal shaft 102. The shaft 102 extends transversely of the apparatus and is alined with the shaft 84 and forms a pivotal support for the other side of the front supporting arm 16. The shaft 102 is journaled within a housing 103 formed integral with the front transverse frame member 5 and has secured thereto a worm 104 meshing with a worm wheel 105 also disposed within the housing 103. As shown in Fig. 7 this worm wheel is secured, as by bolts 106, to the frame section 13 of the cutter carrying body 8. It will thus be seen that when the clutch 98 is connected and one or the other of the friction clutches 44 and 48 is applied, the cutter supporting body 8 may be rotated about its pivotal axis within the bearings 7 on the transverse frame members at either a relatively high speed or a relatively slow speed; and upon application of one or the other of the reverse frictions 63, 64 the cutter supporting body may be rotated at either speed in either of opposite directions. The operating means for the clutches 72 and 98 for connecting the same alternately to effect drive of their respective mechanisms may be substantially the same as those described in my copending application Ser. No. 230,034 mentioned above.

Figure 6:
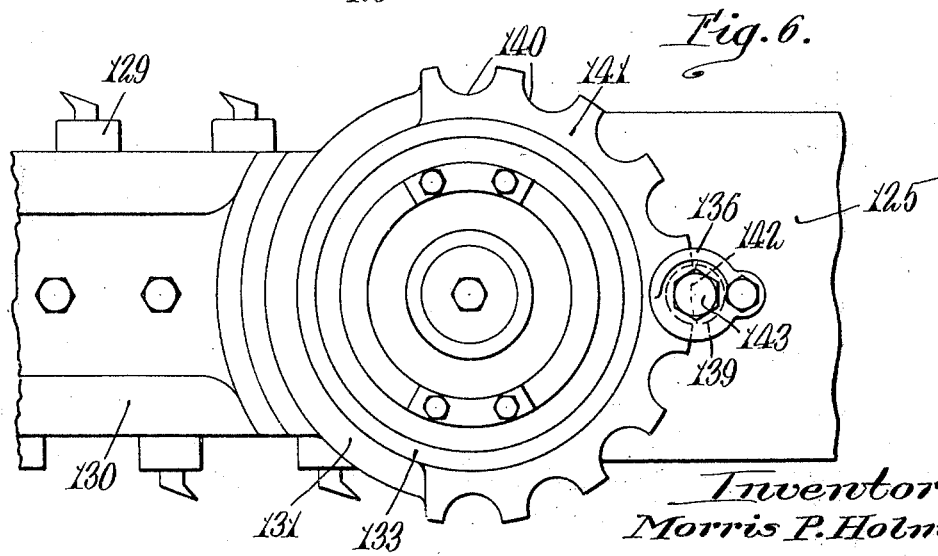
Fig. 6 is a plan view of the improved pivotal mounting for the cutter bar shown in Fig. 4.

Now referring to the improved adjustable kerf cutting mechanism 9 it will be noted that secured as by a key 107 (see Figs. 3 and 7) to the forward end of the motor armature shaft is a coupling member 108 connected by interlocking teeth 109 to an alined shaft 110 arranged coaxially with the shaft 34. The shaft 110 is suitably journaled within the frame section 13 of the body and is connectible by a jaw clutch 111 of a usual design to an alined shaft 112. This shaft 112 is suitably journaled within the cutter frame section 12 and has fixed thereto a bevel pinion 113 meshing with a bevel gear 114 as clearly shown in Fig. 3. This bevel gear is secured to a transverse shaft 115 suitably journaled within the cutter frame section, and also secured to this shaft is a spur pinion 116 meshing with a large spur gear 117 suitably journaled on a transverse shaft 118 journaled within the cutter frame section. Clutched or otherwise connected at 119 to the hub of the spur gear 117 is a clutch member 120 connectible by a shiftable clutch member 121 to a clutch member 122 fixed to the shaft 118. Keyed to one end of the shaft 118 is a chain sprocket 123 connected by an endless transmission chain 124, housed within a hollow supporting arm or extension support 125, to a chain sprocket 126 keyed to a transverse shaft 127. This arm or extension support 125 is pivoted on the cutter frame section 12 about an axis perpendicular to the axis of rotation of the cutter supporting body 8 as hereinafter described. The shaft 127 is suitably journaled within the outer end of the supporting arm 125 and has keyed thereto a drive sprocket 128 which engages and drives an endless cutter bit carrying cutter chain 129 mounted for orbital movement on the margin of an elongated plane cutter bar 130. Now referring to the improved offset pivotal mounting for the cutter bar 130 it will be noted that formed integral with the cutter bar are spaced annular bearing members 131, 132 suitably journaled on bearing sleeves 133 supported on annular bearing portions 134 and 135 herein formed integral with the supporting arm 125. It will thus be seen that the cutter bar is swingable relative to the supporting arm 125; and to hold the cutter bar in its different angular positions of adjustment relative to the supporting arm, there is provided a rotatable locking pin 136 arranged within a bore 137 formed within a boss 138 integral with the supporting arm. This locking pin is provided with a cylindrical body or locking portion 139 which is turnable into locking engagement with any one of a series of notches or recesses 140 herein formed on a radial flange 141 integral with the annular bearing portion 131 for the cutter bar. The locking pin is cut away or arcuately recessed at 142 and is provided with a turning portion 143 with which a suitable instrument is engageable to effect turning of the locking pin. It will be thus noted that when the pin is in the position shown in Figs. 4 and 6 with the body portion 139 in one of the recesses 140 the cutter bar is locked against swinging movement relative to the supporting arm 125. When the locking pin is turned through 180° so as to bring the arcuate recess 142 into a position so that the flange 141 may be moved freely through the recess, the cutter bar is free to swing about its pivotal axis relative to the supporting arm.

In the modification shown in Figs. 16 and 17 the locking pin 136 and its cooperating elements have been omitted and in their places there is provided a worm gear segment 144 secured as by screws 144$^a$ to the annular flange 141 integral with the annular cutter bar bearing member 131. Meshing with the teeth of this worm gear segment is a worm 145 fixed to a transverse shaft 146 suitably journaled within bearing sleeves 147 supported within a boss 148 herein formed integral with the supporting arm 125. The worm and worm gear segment have teeth of such inclination that when the worm is not rotated the teeth automatically lock, thereby holding the cutter bar against swinging movement relative to the supporting arm. Secured as by a key to one end of the shaft 146 is a ratchet ring 149 with which a reversible pawl 150 cooperates, this pawl being carried by an oscillatory lever 151 journaled for rocking movement as at 152 on the outer periphery of the ratchet ring. It will thus be seen that upon oscillation of the lever 151 the worm 141 may be rotated selectively in one direction or the other depending upon the position of the pawl, thereby effecting swinging movement of the worm gear segment together with the cutter bar about its pivotal axis.

Figure 5:
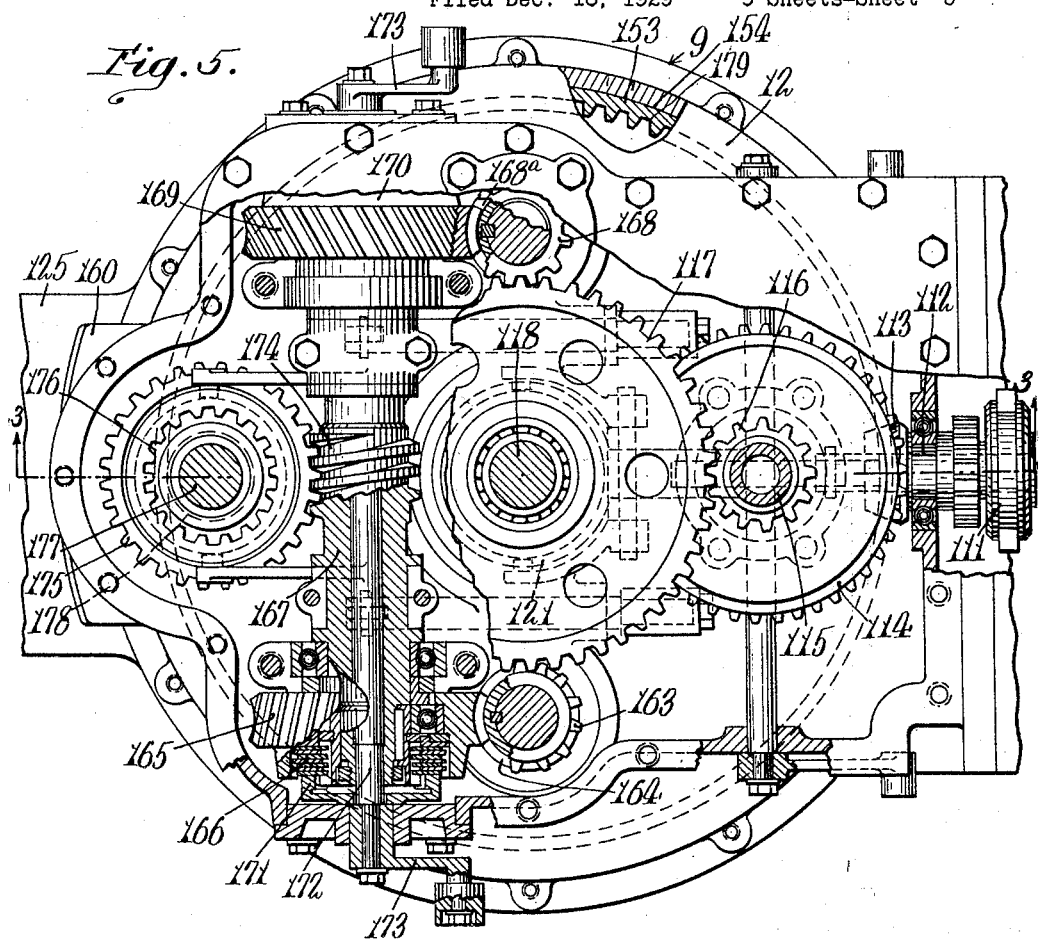
Fig. 5 is a fragmentary plan view of a portion of the mechanism shown in Fig. 3, parts being shown in section to illustrate details of construction.

The improved pivotal mounting for the supporting arm 125 for the cutter bar 130 comprises an annular supporting member (see Fig. 3) 153 mounted within an annular guideway 154 carried by the cutter frame section 12, this guideway being formed by an annular thrust plate or ring 155 secured as by screws 156 to the cutter frame section. This annular member 153 is secured as by screws 157 to a cylindrical housing portion 158 formed integral with the supporting arm 125, and this cylindrical frame has an annular flange 159 also engaging the thrust ring 155. The cutter supporting arm is provided with an integral lip portion 160 engaging an annular flange member 161 secured as by screws 162 to the cutter frame section, and this lip portion and flange cooperate to form an auxiliary guide for the cutter bar during it swinging movement. The mechanism for effecting swinging movement of the supporting arm 125 about its pivotal axis relative to the cutter frame section 12 herein comprises a spur pinion 163 (see Fig. 5) meshing with the spur gear 117 and having rotatable therewith a worm 164 meshing with a slow speed worm wheel 165. This worm wheel is connectible by a friction disc clutch 166 to a transverse shaft 167 suitably journaled within the cutter frame section 12. Also meshing with this spur gear 117 is a spur gear 168 having rotatable therewith a worm 168$^a$ meshing with a fast speed worm wheel 169 having teeth oppositely inclined from and of steeper lead than the teeth of the worm wheel 165. This worm wheel 169 is connectible by a friction clutch 170, similar to the friction clutch 166, to the shaft 167. The operating mechanism for the clutches 166, 170 for effecting application of the same alternatively may be substantially the same as that described in the copending applications mentioned above and herein includes a pressure plate 171 for each clutch and a cooperating operating shaft 172 extending centrally through the shaft 167 and having suitable operating handles 173 at its opposite ends. As illustrated, secured to the shaft 167 intermediate its ends is a worm 174 meshing with a worm wheel 175 connectible as shown in Fig. 3 by a jaw clutch 176 of a usual design to a transverse shaft 177. This jaw clutch includes a shiftable clutch member connecting, when in its connected position, clutch elements secured to the worm wheel and shaft respectively and is provided with suitable operating mechanism for shifting the clutch member 176 as clearly described in the above mentioned copending applications. The shaft 177 is suitably journaled within the cutter frame section and has secured thereto and rotatable therewith a spur pinion 178 meshing with the teeth of an internal gear 179 herein formed integral with the annular supporting member 153 for the cutter supporting arm 125. It will thus be seen that when the friction clutch 166 is applied, the supporting arm 125, together with the cutter bar 130 carried thereby, may be swung about its pivotal axis in one direction at a relatively slow speed appropriate for cutting, and when the clutch 166 is released and upon application of the friction clutch 170 the supporting arm may be swung in the opposite direction at a relatively fast bar positioning speed. It will also be evident that when the jaw clutches 111 and 121 are connected the cutter chain 129 may be rapidly circulated about the outer edges of the cutter bar 130 through the spur gearing 117, 116, bevel gearing 114, 113 and the shaft 110 connected to the motor shaft.

Electrical energy may be conducted to the motor 10 through a flexible conductor cable 180 wound upon a cable reel 181 rotatably supported by a transverse shaft 182 journaled at 183 within brackets carried by the rear portion of the supporting frame 1. Secured to the shaft 182 is a bevel gear 184 meshing with a bevel gear 185 fixed about a longitudinally extending shaft 186. As shown in Fig. 10, the shaft 186 is connected by a universal joint 187 to a shaft 188 which is in turn connectible by a releasable ratchet device 189 to the shaft 65. The ratchet device 189 is manually operable and is provided with a manual operating element 190. There is provided a slip friction 191 between the ratchet device 189 and the shaft 65. This ratchet device includes a spring pressed pawl 192 carried by the shaft 188 and engageable with a ratchet tooth 193 formed on an element 194 of the friction clutch 191 so that when the shaft 65 is driven in one direction the pawl 192 engages the ratchet tooth 193, and as a result the cable reel is driven. Upon reversal of the shaft 65 the pawl slips over the ratchet tooth, automatically disconnecting the shaft and cable reel from its drive. The friction clutch 191 is so set that it will slip automatically upon overload of the reel device. It will thus be seen that the cable reel may be driven by power in only one direction.

Braking means is provided for holding the truck wheels 2 against rotation during certain of the cutting operations and when the machine is moving along an inclined trackway, and herein comprises brake drums 194, 195 secured as shown in Figs. 8 and 9 to the hubs of the chain sprockets 83, 81 respectively secured to the transverse shafts 84 and 76 which are connected through chain and sprocket connections to the truck wheel axles. Cooperating with these brake drums are contractible brake bands 195a having suitable toggle operating mechanism 196 connected, as shown in Fig. 15, by a pull rod 197 to an operating lever 198.

The general mode of operation of the improved mining apparatus is as follows: The apparatus is propelled forwardly about the mine at a relatively high transport speed under the control of the fast speed truck drive controlling clutch 44 and the reverse friction 63. It is evident that by releasing the friction clutch 63 and applying the friction clutch 64 the apparatus may be propelled rearward along the mine trackway at a fast speed. When the coal face is reached the friction clutch 44 is released and if it is desired to make a horizontal cut on the mine bottom outside of and below the level of the mine trackway, the operator rotates the locking pin 136 to release the cutter bar 130 from the supporting arm 125. Upon application of the clutch 170 fast speed swinging mechanism is connected to the motor 10 and as a result the cutter supporting arm 125 is swung laterally from the central longitudinal position shown in Fig. 1 to the position indicated at A in Fig. 18. When the outer end of the cutter bar 130 engages the right hand rib and swinging movement of the supporting arm 125 is continued, the cutter bar assumes the angular position relative to the supporting arm as shown in Fig. 18. When the parts are thus disposed the friction clutch 170 is released and the locking pin 136 is again rotated to lock the cutter bar to the supporting arm. It will be noted that the worm gearing of the bar swinging mechanism is of the self-locking type and when disconnected from the motor automatically locks the cutter supporting arm 125 against swinging movement relative to the machine body. The operator then applies the friction clutches 48 and 56, thereby effecting power rotation of the adjusting screws 25 and 26, and as a result the pivoted supporting arms 16 and 17 are swung downwardly, moving the cutting mechanism to a position wherein the cutter bar 130 lies adjacent the mine bottom, the friction clutches 48 and 56 thereafter being released. The clutches 111 and 121 are then connected and as a result the cutter chain 129 is rapidly circulated about the margin of the cutter bar. The operator then applies the friction clutch 48 and the reverse friction 61 and as a result the truck wheels are driven by the motor at a relatively slow cutting speed, thereby propelling the apparatus bodily along the mine trackway to move the cutter bar from the position indicated at A in Fig. 18 to the position indicated at B to effect the sumping cut, the clutches thereafter being released. The operator then grasps the brake lever 198, applying the brakes and thereby holding the truck wheels against rotation to prevent movement of the apparatus along the mine trackway. The locking pin 136 is then rotated to release the cutter bar 130 from the supporting arm 125, and upon application of the slow bar swinging clutch 166 the supporting arm 125 is swung laterally in a direction from right to left, thereby moving the cutter bar and supporting arm in alinement as indicated at C as seen in Fig. 18, the cutter bar thereafter being locked by the locking pin to the supporting arms. When the cutter bar and supporting arm are in the position indicated at C in Fig. 18, the operator applies the slow bar swing controlling clutch 166, thereby causing the cutter bar and supporting arm to be swung about the pivotal axis of the latter at a relatively slow cutting speed, moving the cutter bar from the position C in Fig. 18 to the position D indicated in that figure to effect the transverse cut. The locking pin 136 is then released and upon continued swinging movement of the cutter supporting arm 125 the parts assume the angular position indicated at E in Fig. 18, the clutch 166 thereafter being released and the bar locked to the supporting arm 125. The brakes 194 are then released and upon application of the slow speed truck drive control clutch 48 and the reverse friction 64 the truck wheels are driven at a slow speed in the reverse direction to propel the apparatus bodily rearward along the mine trackway to move the cutter bar from the position indicated at E in Fig. 18 to the position indicated at F in that figure to effect the withdrawal cut, the clutches 64 and 48 thereafter being released. The elevating arms 16 and 17 are then swung upwardly to elevate the cutting mechanism into the position shown in Fig. 3 with the cutter bar at a substantial distance above the tops of the track rails. The cutter bar is then swung into alinement with the supporting arm and locked and the supporting arm and cutter bar are swung to the central longitudinal position shown in Fig. 1. The apparatus is then propelled rearward along the mine trackway at a relatively high transport speed to another working place.

If it is desired to make a longwall cut at or near the level of the mine bottom outside of and below the level of the trackway, the cutter supporting arm 125 and the cutter bar 130 are swung laterally from the position shown in Fig. 1 to the right angle position shown in Fig. 19. The elevating arms 16 and 17 are then swung downwardly to lower the cutting mechanism to position the cutter bar at or near the level of the mine bottom. The slow truck drive controlling friction 48 is then applied and upon application of the reverse friction 54 the apparatus is propelled bodily rearward along the mine trackway at a cutting speed to effect movement of the cutter bar beneath the coal to effect a longwall cut. If it is desired to tilt the cutting mechanism about a transverse axis to change the angle of the cutter bar relative to the horizontal this may be accomplished simply by moving the clutch 30 to a position to disconnect the screw shaft 25 from the shaft 26. The friction clutch 48 and one or the other of the reverse frictions 55, 56 is applied, thereby effecting rotation of the screw shaft 26 in one direction or the other to swing the rear supporting arm 17 either upwardly or downwardly. As a result, the machine body, together with the cutting mechanism supported thereby, is tilted about the axis of the front truck wheel axle 88. It will thus be seen that upon suitable actuation of the supporting arms 16 and 17 the cutting mechanism may be moved into various elevated positions and may be tilted either upwardly or downwardly about a transverse axis.

If it is desired to make a shear or vertical cut in the coal face, the operator moves the clutch 98 into its connected position, at the same time releasing the truck drive control clutch 72, and upon application of the friction clutches 44 and 61 the machine body, together with the cutting mechanism supported thereby, is rotated about a longitudinal axis within its bearings 7 on the transverse frame members 5, 6, thereby moving the cutter bar into a position wherein it may swing vertically. The cutter bar is then swung upwardly to a position adjacent the mine roof, sumped in, swung downwardly and withdrawn in the same manner as that described above in regard to the horizontal cut. During the shearing operation the cutter bar and supporting arm 125 are locked in alinement. It is evident that the cutter supporting body 8 may be rotated about its axis to position the cutter bar in a plurality of intersecting planes about the body axis and that the cutting mechanism is capable of not only undercutting and shearing but also may overcut if desired. It will be noted that upon release of the ratchet 189 controlling the cable reel drive, the cable reel may rotate to freely pay out the conductor cable 180 as the apparatus moves forwardly along the mine trackway and upon connection of said ratchet to wind in the conductor cable 180 by power as the apparatus moves rearwardly along the trackway or may be rotated by power while the apparatus remains stationary on the trackway.

As a result of this invention, it will be noted that an improved mining apparatus is provided having improved adjustable kerf cutting mechanism whereby the kerf cutter may be positioned to cut a kerf at or near the level of the mine bottom outside of and below the level of the mine trackway. It will further be noted that an improved offset pivotal mounting is provided for the cutter bar whereby the latter may be operated as a bottom cutter. It will still further be noted that an improved offset pivotal mounting is provided for the cutting mechanism of a mining apparatus of the wheel mounted type which is extremely flexible in adjustment, thereby enabling the cutter bar to operate to cut a kerf at the level of the mine bottom or to cut vertical or shear kerfs in accordance with the arcwall method of mining, the improved bar mounting being of a simple and rugged design readily adapted for attachment to a coal mining apparatus of a standard design. These and other uses and advantages of the improved mining apparatus will be clearly apparent to those skilled in the art.

While there is in this application specifically described one form, and a modification thereof, which the invention may assume in practice, it will be understood that this form and modification of the same are shown for purposes of illustration and that the invention may be modified and embodied in various other forms without departing from its spirit or the scope of the appended claims.

What I claim as new and desire to secure by Letters Patent is:

1. In a mining apparatus, a portable frame, kerf cutting mechanism mounted on said frame including a cutter head rotatable about a longitudinal axis, a supporting arm pivotally mounted on said cutter head for swinging movement relative thereto and adjustable therewith about the head axis, mechanism for adjusting said arm in a vertical direction, a cutter bar pivotally mounted on the outer end of said arm for independent swinging movement relative thereto about an axis parallel to the pivotal axis of said arm, and releasable locking means for holding said cutter bar in its different angular positions relative to said arm.

2. In a mining apparatus, a portable frame, kerf cutting mechanism mounted on said frame including a cutter head rotatable about a longitudinal axis, a supporting arm pivotally mounted on said cutter head for swinging movement relative thereto and adjustable therewith about the head axis, mechanism for adjusting said arm in a vertical direction, a cutter bar pivotally mounted on the outer end of said arm for independent swinging movement relative thereto about an axis parallel to the pivotal axis of said arm, releasable locking means for holding said cutter bar in its different angular positions relative to said arm, and mechanism for swinging said arm about its pivot.

3. In a mining apparatus, a portable frame, a motor carried by said frame, kerf cutting mechanism mounted on said frame including a cutter head rotatable about a longitudinal axis, a supporting arm pivotally mounted on said cutter head for swinging movement relative thereto and adjustable therewith about the head axis, mechanism for adjusting said arm in a vertical direction, a cutter bar pivotally mounted on the outer end of said arm for independent swinging movement relative thereto about an axis parallel to the pivotal axis of said arm, and a cutter chain carried by said bar, mechanism driven by said motor for driving said cutter chain, and releasable locking means for holding said cutter bar in its different angular positions relative to said arm.

4. In a mining apparatus, a portable frame, a motor carried by said frame, kerf cutting mechanism mounted on said frame including a cutter head rotatable about a longitudinal axis, a supporting arm pivotally mounted on said cutter head for swinging movement relative thereto and adjustable therewith about the head axis, mechanism for adjusting said arm in a vertical direction, a cutter bar pivotally mounted on the outer end of said arm for independent swinging movement relative thereto about an axis parallel to the pivotal axis of said arm, and a cutter chain carried by said bar, mechanism driven by said motor for driving said cutter chain, releasable locking means for holding said cutter bar in its different angular positions relative to said arm, and mechanism driven by said motor for swinging said arm about its pivot.

5. In a mining apparatus, a wheeled frame adapted to run along a trackway, mechanism for bodily adjusting said frame into different elevated positions, cutting mechanism carried by said frame including a supporting arm pivotally mounted on the forward end of said frame upon an axis in a vertical plane at right angles to the trackway to swing across the front of said wheeled frame in advance of the front wheels thereof, a cutter bar pivotally mounted on the outer end of said arm for independent swinging movement relative thereto, a releasable locking device for holding said cutter bar in its different angular positions relative to said arm, and mechanism for swinging said arm about its pivot.

6. In a mining apparatus, a portable support, kerf cutting mechanism mounted thereon including a cutter carrying head rotatable relative to said support about a longitudinal axis, an arm pivotally mounted on said head for swinging movement relative thereto, a cutter bar pivotally mounted on the outer extremity of said arm for independent swinging movement relative thereto about an axis parallel to the pivotal axis of said arm, mechanism for swinging said arm about its pivot relative to said head, and means for holding said cutter bar in its different angular positions relative to said arm including a locking member carried by one of said elements, and cooperating locking recesses carried by said other element.

7. In a mining apparatus, a portable support, kerf cutting mechanism mounted thereon including a cutter carrying head rotatable relative to said support about a longitudinal axis, an arm pivotally mounted on said head for swinging movement relative thereto, a cutter bar pivotally mounted on the outer extremity of said arm for independent swinging movement relative thereto about an axis parallel to the pivotal axis of said arm, mechanism for swinging said arm about its pivot relative to said head, and means for holding said cutter bar in its different angular positions relative to said arm including a locking member carried by said arm and cooperating locking recesses carried by said cutter bar.

8. In a mining apparatus, a portable support, kerf cutting mechanism mounted thereon including a cutter carrying head rotatable relative to said support about a longitudinal axis, a hollow arm pivotally mounted on said head for swinging movement relative thereto, a cutter bar pivotally mounted on the outer extremity of said arm for independent swinging movement relative thereto about an axis parallel to the pivotal axis of said arm, means for holding said cutter bar in its different adjusted positions relative to said arm, mechanism for swinging said arm about its pivot, a motor carried by said support, and driving connections between said motor and said cutting mechanism including drive sprockets arranged with their axes alined with the pivotal axes of said arm and cutter bar respectively, and a drive chain engaging said sprockets and housed in said arm.

9. In a mining apparatus, a wheeled support adapted to travel along a mine trackway and having its forward end overhanging the front support wheels, devices between the support wheels and said support for adjusting the latter bodily into different elevated positions relative to the trackway, an arm pivotally mounted on the overhanging end of said support for swinging movement horizontally across the front end of said support, a kerf cutter pivotally mounted on the outer extremity of said arm for free horizontal swinging movement relative thereto, and devices for locking said kerf cutter in different predetermined angular positions relative to said arm.

10. In a mining apparatus, a wheeled support adapted to travel along a mine trackway, a frame thereon rotatable relative thereto about a longitudinal axis and overhanging the front support wheels, an arm pivotally mounted on said rotatable frame for swinging movement relative thereto, a kerf cutter pivotally mounted on the outer extremity of said arm for free horizontal swinging movement relative thereto about an axis parallel to the pivot axis of said arm, and devices for locking said kerf cutter in different predetermined angular positions relative to said arm.

11. In a mining apparatus, a wheeled support adapted to travel along a mine trackway, a frame thereon rotatable relative thereto about a longitudinal axis and overhanging the front support wheels, an arm pivotally mounted on said rotatable frame for swinging movement relative thereto, a kerf cutter pivotally mounted on the outer extremity of said arm for free horizontal swinging movement relative thereto about an axis parallel to the pivot axis of said arm, devices for locking said kerf cutter in different predetermined angular positions relative to said arm, said arm being swingable horizontally to position said kerf cutter with its pivot outside the mine trackway, and mechanism for adjusting said arm in a vertical direction to position said kerf cutter to cut a kerf at the level of the mine bottom outside and below the level of the mine trackway.

12. In a mining apparatus, a wheeled support adapted to travel along a mine trackway and mounted for tilting movement about a transverse axis to change its angle in altitude, a frame on said support rotatable relative thereto about a longitudinal axis and overhanging the front support wheels, an arm pivotally mounted on said rotatable frame for swinging movement relative thereto, a kerf cutter pivotally mounted on the outer extremity of said arm for free swinging movement relative thereto about an axis parallel to said arm axis, and devices for locking said kerf cutter in different predetermined angular positions relative to said arm.

13. In a mining apparatus, kerf cutting mechanism including a swingable arm, a kerf cutter and a pivotal mounting for said kerf cutter on the outer extremity of said arm to permit free swinging movement of said kerf cutter comprising oppositely projecting annular bearing surfaces on the opposite sides of said arm, cooperating annular bearing elements surrounding and engaging said bearing surfaces, and devices for locking said kerf cutter in different predetermined angular positions relative to said arm including cooperating locking elements on said arm and one of said bearing elements respectively.

14. In a mining apparatus, kerf cutting mechanism including a swingable arm, a kerf cutter and a pivotal mounting for said kerf cutter on the outer extremity of said arm to permit free swinging movement of said kerf cutter comprising spaced bearing elements on said kerf cutter between which said arm projects, said arm having bearing surfaces at the opposite sides thereof with which said bearing elements cooperate, and devices for locking said kerf cutter in different predetermined angular positions relative to said arm comprising cooperating relatively rotatable locking elements on said arm and one of said bearing elements respectively.

15. In a mining apparatus, kerf cutting mechanism including a swingable arm, a kerf cutter, a pivotal mounting for said kerf cutter on the outer extremity of said arm comprising oppositely projecting annular bearing surfaces on the opposite sides of said arm, cooperating annular bearing elements surrounding and engaging said bearing surfaces, and devices for locking said kerf cutter in different predetermined angular positions relative to said arm comprising a releasable locking element engageable with a locking element on one of said bearing elements.

16. In a mining apparatus, kerf cutting mechanism including a swingable arm, a kerf cutter, a pivotal mounting for said kerf cutter on the outer extremity of said arm comprising spaced bearing elements on said kerf cutter between which said arm projects, said arm having bearing surfaces at the opposite sides thereof with which said bearing elements cooperate, and devices for locking said kerf cutter in different predetermined angular positions relative to said arm comprising a rotatable locking pin carried by said arm and cooperating locking recesses on one of said bearing elements, said kerf cutter being freely swingable when said pin is disengaged from said recesses.

In testimony whereof I affix my signature.

MORRIS P. HOLMES.